United States Patent [19]
Suzuki

[11] 3,752,064
[45] Aug. 14, 1973

[54] MACHINE FOR SHEARING AND COMPRESSING SCRAP METALS

[76] Inventor: Masao Suzuki, 880 Sezaki-cho, Soka, Japan

[22] Filed: June 7, 1971

[21] Appl. No.: 150,594

[52] U.S. Cl.............. 100/98 R, 83/923, 83/925 R, 100/DIG. 1, 100/233
[51] Int. Cl........................................... B30b 15/08
[58] Field of Search.................... 100/DIG. 1, 98 R, 100/233; 83/599, 601, 607, 695, 923, 925 R

[56] References Cited
UNITED STATES PATENTS

| | | | |
|---|---|---|---|
| 3,129,656 | 4/1964 | Judd | 100/98 R |
| 3,645,159 | 2/1972 | Chazen | 83/923 X |
| 2,811,100 | 10/1957 | Lindemann | 100/98 R |
| 3,237,554 | 3/1966 | Davis, Jr. | 100/DIG. 1 |
| 3,279,295 | 10/1966 | Teplitz | 83/601 |

*Primary Examiner*—Robert L. Bleutge
*Attorney*—Arthur T. Fattibene

[57] ABSTRACT

A machine for processing scrap metal having a shear arm rotatably mounted on a machine body and having a drive motor operatively connected thereto for driving the arm relative to the machine body to effect a shearing action on the scrap metal. Cooperatively associated with the shear arm is a driving ram member, to compress the sheared scrap metal into a compact form upon operation of the shear arm. In operation the scrap metal is first caused to be sheared by the operation of the shear arm and then compressed into a compact block by the action of the ram.

6 Claims, 4 Drawing Figures

PATENTED AUG 14 1973

3,752,064

INVENTOR
MASAO SUZUKI
BY
Arthur P. Fattibene
ATTORNEY

MACHINE FOR SHEARING AND COMPRESSING SCRAP METALS

This invention relates to a machine for shearing metal scrap and compressing the scrap into a compact form.

Modern mass-production inevitably increases the yield of new scrap metal that has not been used in an end product. Mass-production also yields various kinds of old scrap metal that has been discarded after use. Such new and old scraps should be disposed of in such a manner that they do not spoil our environment and the beauty of scenery; and as a solution thereof the scraps are returned to the metallurgical industry for reprocessing. Scrap metals are important as a source of metals and alloys for industrial use. Scrap irons are particularly important in the production of steel. Therefore steel producers buy back the new scrap from manufacturers to whom they sell primary metal and purchase the old scrap from scrap metal or junk dealers.

New and old scrap metals which are gathered from widely scattered sources, are of various form, shape and size. Old scrap metals are sometimes bulky, irregular-shaped scrap, such as old oil drums or structural steel scrap. Thus, there needs a processing of such scrap metal for changing it into a compact form before its delivery to the customer.

Scrap metals are conventionally treated first by burning combustible parts and then compressing them into compact forms, such as employed in scrapping used cars. However, such processing takes much time and labor and requires an expensive equipment of large scale.

The present invention is to provide, therefore, an improved machine for mechanically processing bulky and irregular shaped scrap metals so that the scraps may be changed to objects which are easy to handle.

The invention will now be described in detail with reference to the accompanying drawings, in which.

Figure 1:
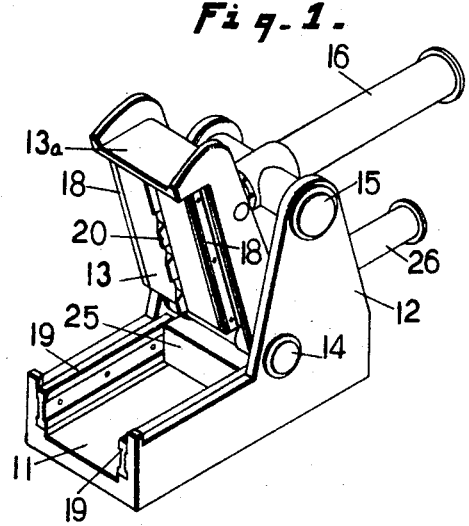
FIG. 1 is a perspective view of a machine of the invention.

Referring now to the drawings, the machine of the invention includes a rigid base 11 intended to be installed on the ground and a rigid carriage 12 which is formed with a pair of spaced parallel plates. The base 11 has a U-shaped cross section. An arm member 13 of inverted L-shape with one limb longer than the other is journalled, at the end of the longer limb, to the lower end portion of the carriage 12 by means of an axis 14 so that the arm 13 may swing about the axis 14 in the space between the parallel plates of the carriage 12. Pivotally connected to the upper end portion of the carriage at 15 is a fluid motor 16 of which piston rod 17 is jointed to the arm member 13. Thus, the supply of fluid pressure to the fluid motor 16 drives the piston rod 17 outwardly so that the arm member 13 will swing down about the axis 14 and enter the space which is defined by the opposite side walls of the U-shaped base 11.

Figure 2:
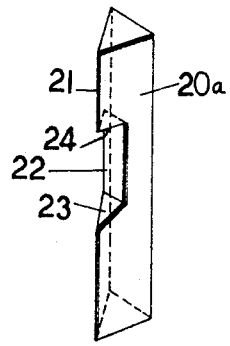
FIG. 2 shows a unit of blade used in the machine.

The arm member 13 is provided on both sides thereof with a pair of blades 18 which cooperate with a pair of fixed blades 19 provided on the upper ends of the U-shaped base 11. The swing arm 13 is further provided along the center line thereof with a blade 20. This center blade 20 is formed by arranging a number of blade unit 20a in a file. Each blade unit 20a has a triangular cross section, as shown especially in FIG. 2, and is adapted to be removably fixed into a corresponding triangular groove formed in the arm member 13. The cutting edge 21 of the blade unit 20a has a notch 22 of which one side 23 is sloped with respect to the length of the blade unit. The other side 24 of notch 22 is normal to the length of the blade unit. This straight side 24 of notch 22 is arranged, when the blade unit 20a is mounted in the arm member 13, at a position remote from the swing axis 14 of the arm member 13. Thus, the notch 22 in the center blade 20 serves to engage with a scrap metal for grasping during its cutting operation. The provision of the center blade 20 has an advantage in that it prevents the blades 18 and 19 in cutting a hard scrap, since the force of the arm 13 will first concentrate upon the center blade for producing a great power for breaking a hard, bulky, irregular-shaped scrap prior to the shearing action in-between the blades 18 and 19. The center blade 20 also facilitates to crush a hard cast metal. The assembly construction of the center blade 20 is useful for renewing the blade unit when it is damaged. The notch in the blade unit also facilitate to grasp and catch a scrap metal which has a smooth surface.

The machine of the invention is further provided with a press element. This press consists of a ram block 25 which is driven reciprocally by a fluid motor 26. For cooperation with the ram block 25, the swing arm 13 has at the free end thereof a shorter limb portion 13a. The shorter limb 13a serves as an anvil for receiving a scrap metal when the latter is pressed by the ram block 25.

Figure 3:
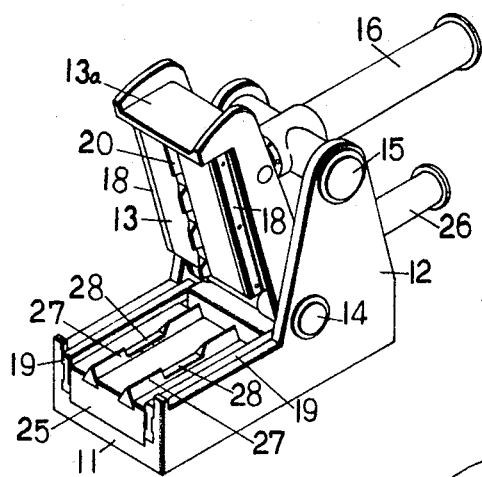
FIG. 3 is a view similar to FIG. 1, but showing its press element being at an advanced position.

The ram block 25 has the upper side thereof a pair of parallel blades 27 which are of similar construction to the blade unit 20a as described and illustrated above. That is the blades 27 on the ram block 25 have notches 28, respectively, adapted to engage with a scrap metal. The triangular blade 27 on the ram block 25 cooperate with the center blade 20 in the arm member 13 to crush a hard scrap metal with their firm grasping by the respective notch on the blade. In operation, the ram block 25 is first placed in its advanced position as shown in FIG. 3 by the actuation of the fluid motor 26, then a scrap metal is placed on the ram block 25. Thereafter, the fluid motor 26 is driven in reverse direction for slightly retracting the ram block 25 until the scrap metal on the block 25 comes to a position near the root end of the arm member 13. Thus, by the swing-down motion of the arm member 13, the scrap metal will be subjected to a stronger shearing stress, since the more close an article is placed to the axis of rotation of a shear lever, the stronger shearing force is given to the article.

Figure 4:
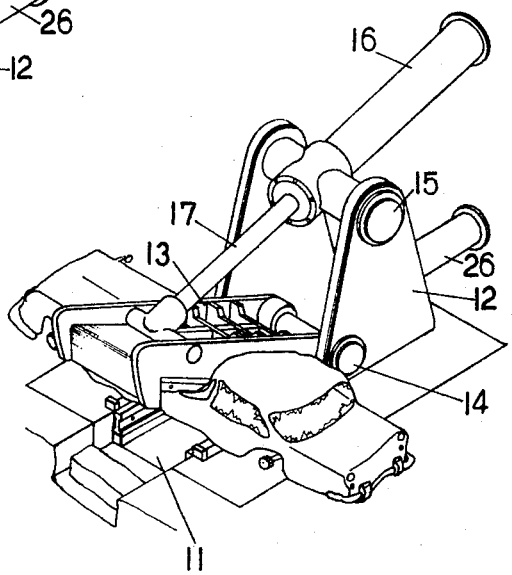
FIG. 4 illustrates an operation of the machine.

FIG. 4 illustrates the scrapping operation of a used car. As shown in this figure, the used car is first cut into pieces by the shearing process. Then, the ram block operates to compress the scrap into a compact form. After compressing the scrap metal into a compact square block, the arm 13 is swung up and the ram block 25 is driven forwardly for discharging the scrap block from cavity between the opposite side walls of U-shaped machine base 11.

What is claimed is:

1. A machine for shearing and compressing scrap metals comprising:

a carriage defined by a pair of spaced apart plates,
a base disposed between said spaced apart plates to define a U-shaped cross section,
an arm member,
pivot means for pivotally mounting said arm member between said pair of spaced apart plates whereby said arm member pivots toward and away from said base,
a first motor means for driving said arm member toward and away from said base about said pivot means,
complementary blades connected along the opposed edges of said base and arm member adapted to effect a shearing action when said arm member pivots toward said base,
a ram member slidably disposed on said base between said base blades, and between said base and said arm member,
a second motor means operatively connected to said ram member to render said ram member movable relative to said base member whereby said ram member is operative to advance scrap metal nearer to the pivoting axis of said arm member to enhance the shearing force of said arm member when the latter is actuated.

2. The invention as defined in claim 1 wherein said arm member comprises an inverted L-shaped member having a longer compressing side overlying said base, and having a shorter side adapted to cooperate with said ram member as an anvil for compressing any scrap disposed between said ram member and said shorter side when said ram member is driven toward said shorter side, and said blades connected to said arm member being disposed along the opposed longitudinal edges of said longer compressing side.

3. The invention as defined in claim 2 and including a ram blade connected to said ram member, said ram blade being disposed between said opposed arm member blades to cooperate with said arm blades as said arm member pivots toward said base.

4. The invention as defined in claim 3 wherein said ram blades include a notch formed therein.

5. The invention as defined in claim 2 and including a center blade connected to said arm member, said center blade having a notch formed therein for grasping the scrap metal during a shearing operation.

6. The invention as defined in claim 5 wherein said notch having one side inclined relative to the axis of said center blade and having its other side disposed normal to the axis of said center blade.

* * * * *